United States Patent [19]
Wheeler et al.

[11] Patent Number: 5,513,533
[45] Date of Patent: May 7, 1996

[54] DETECTION OF VIBRATIONAL ENERGY VIA OPTICAL INTERFERENCE PATTERNS

[75] Inventors: Bradford A. Wheeler, Hope Valley; Antonio L. Deus, Westerly, both of R.I.

[73] Assignee: The United States of America as represented by the Secretary of the Navy, Washington, D.C.

[21] Appl. No.: 46,255

[22] Filed: Apr. 15, 1993

[51] Int. Cl.[6] .............................. G01B 11/06; G01H 9/00
[52] U.S. Cl. .................... 73/657; 356/356; 356/355; 356/358
[58] Field of Search .................... 356/354, 355, 356/356, 357, 358; 73/655, 657, 656

[56] References Cited

U.S. PATENT DOCUMENTS

| | | | |
|---|---|---|---|
| 3,698,792 | 10/1972 | Kusters | 359/313 |
| 4,172,382 | 10/1979 | Murphy et al. | 73/655 |
| 4,380,394 | 4/1983 | Stowe | 356/358 |
| 4,606,641 | 8/1986 | Yamada et al. | 356/369 |
| 4,660,980 | 4/1987 | Takabayashi et al. | 356/357 |

OTHER PUBLICATIONS

"Ultrasonic Testing of Materials" by Josef Krautkrämer and Herbert Krautkrämer, Chapter 7, pp. 119–149 (1977).
"Ultrasonic Testing of Materials" by Josef Krautkrämer and Herbert Krautkrämer, Chapter 13, pp. 289–306 (1977).

*Primary Examiner*—Hezron E. Williams
*Assistant Examiner*—Rose M. Finley
*Attorney, Agent, or Firm*—Michael J. McGowan; Prithvi C. Lall; Michael F. Oglo

[57] ABSTRACT

A method and apparatus for sensing and measuring vibrational energy in a structure subject to vibrations is described. The method comprises the steps of applying a thin transparent film material having a thickness to a structure subject to vibrations and measuring the vibrational energy within the structure by measuring changes in the thickness of the thin transparent film material resulting from vibrations within the structure being transmitted to the thin transparent film material. The apparatus for sensing and measuring the vibrational energy comprises a light source for generating a coherent light beam, the thin transparent film material, and a detector for receiving reflected light rays from the top and bottom surfaces of the film material.

28 Claims, 2 Drawing Sheets

DETECTION OF VIBRATIONAL ENERGY VIA OPTICAL INTERFERENCE PATTERNS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a method and apparatus for sensing and measuring vibrational energy in a structure using optical interference patterns.

(2) Description of the Prior Art

There are many structures subject to vibrational energy for which it is necessary to obtain information about the magnitude of the vibrations experienced by that structure. Such structures include space platforms, helicopter blades, mechanical components aboard ships and other vehicles, and mechanical equipment in electrical generators. A variety of analyzers employing optical techniques have been developed to measure the vibrational energy in the structures.

One such analyzer is illustrated in U.S. Pat. No. 3,449,944 to Zavodny. The analyzer shown therein includes a source of coherent electromagnetic radiation such as a laser and a lens mounted to a structure experiencing vibrational energy. A plurality of spaced beams or rays of electromagnetic radiation developed by the source are directed through the lens, which preferably has non-parallel faces and which is capable of causing the rays to intersect each other at a location spaced from the lens. The intersecting rays of coherent radiation form a phase interference pattern which varies markedly and in a predictable fashion as the lens is moved in the slightest degree as a result of the vibration being imparted thereto. The analyzer also includes a detector which responds to changes in the interference pattern.

U.S. Pat. No. 4,525,626 to Kush et al. illustrates another analyzer for measuring the dynamic behavior of a structure. The analyzer comprises a single optical fiber attached to or imbedded in the structure in a predetermined pattern relative to the beams longitudinal dimensions and the characteristic resonant vibration bending modes of the structure. The pattern is arranged to prevent cancellation of optical signal phase variations induced by even order structural vibration modes. A light beam is launched at the input end of the fiber to propagate therethrough in at least two modes. These modes form interference patterns, at the end of the fiber, with intensities that vary as functions of the vibration modes of the structure. The intensity modulated light is coupled to a light detector wherefrom electrical signals are provided that are representative of vibration modal responses.

U.S. Pat. No. 4,577,508 to Chaplin illustrates still another optical vibration analyzer. The Chaplin device has a fiber optic probe which collects back scattered light from a vibrating surface illuminated with non-coherent light. The probe is positioned close to the vibrating surface such that the amount of light scattered back into the fiber optic probe varies with the instantaneous relative separation between the probe and the vibrating surface. A photo-diode detects the varying average intensity of light received by the probe and generates a light intensity signal which is amplified to a usable level. Vibrations in the observed surface are excited by a sweep oscillator and the received signal is processed through a tracking filter locked to the sweep oscillator. The filtered output is monitored and varies directly with the vibration amplitude of the surface.

U.S. Pat. No. 4,801,799 to Tromborg et al. relates to a fiber optic vibration sensor for detecting vibrations in a reflecting surface located externally of the sensor. The sensor includes a transparent body, source and return optic fibers fastened to the body, and a light collimating lens which forms light emanating from the source fiber into a column which extends in a predetermined viewing direction relative to the body. The sensor is positioned relative to the reflecting surface so that the column strikes the reflecting surface and is reflected back through the lens to a focal point in the vicinity of the end of the return optic fiber.

Similar devices employing optical techniques are used to detect acoustic vibrations. U.S. Pat. Nos. 4,446,543 to McLandrich et al. and 4,599,711 to Cuomo illustrate two such devices.

The McLandrich et al. patent relates to a hydrophone which remotely senses impinging acoustic energy. Light output from a laser is split and launched into a single mode fiber which transmits it to an optical resonator at its end. The resonator is made up of a fixed fiber end having a dielectric coating and a movable mirror which is displaced in response to an incident acoustic signal. The acoustic signal displaces the mirror so that mirror movement modulates the intensity of the reflected beam which is transmitted back through the single mode fiber and received at a detector. The frequency and magnitude of the reflected beam yield acoustic signal information.

The Cuomo patent illustrates a transducer having one light transmitting fiber and two receiving fibers having different core diameters. The two receiving fibers are separated at one end and combined at a common distal end in the vicinity of a reflective surface parallel to the fiber end plane which is sensitive to axial motion caused by minute pressure changes such that any displacement of the reflector from equilibrium will increase or decrease the illuminated areas of the two receiving fibers which can be used to generate a processed output signal proportional to this motion.

Piezoelectric transducers are also used to measure vibrational energy in structures. These transducers however are large in size, have nominal receive sensitivity relative to size and require complex wiring and digital equipment to analyze the recorded vibrational energy. They also require complex shielding and construction techniques to reduce electromagnetic interference.

Accordingly, it is an object of the present invention to provide an apparatus for measuring vibrational energy in a structure which is smaller in size and easier to use.

It is a further object of the present invention to provide an apparatus as above which does not require complex computational devices.

It is still a further object of the present invention to provide an improved method for sensing and measuring vibrational energy in a structure.

Still other objects and advantages will become more apparent from the following description and drawings wherein like reference numerals depict like elements.

SUMMARY OF THE INVENTION

The foregoing objects are attained by the method and apparatus of the present invention. In accordance with the present invention, a method for sensing and measuring vibrational energy in a structure subject to vibrations is set out. The method broadly comprises the steps of applying a thin transparent film material having a thickness to a structure subject to vibrations and measuring the vibrational energy within the structure by measuring changes in the thickness of the thin transparent film material resulting from vibrations within the structure being transmitted to the thin transparent film material. The measuring step comprises illuminating surfaces of the transparent film material and monitoring changes in the thickness of the thin transparent film material by measuring the phase differences between first and second beams reflected by the surfaces or time rate changes in the resulting fringe pattern.

The vibrational energy sensing and measuring apparatus of the present invention broadly comprises a thin transparent film material vibration detector coupled to a structure subject to vibrations and means for measuring the vibrational energy within the structure by measuring changes in the thickness of the thin transparent film material resulting from vibrations within the structure being transmitted to the thin transparent film material. In a first embodiment, the thin transparent film material detector comprises a thin film of oil contained within a plastic containment pouch, a metallic reflector bonded to a bottom surface of the pouch, and an epoxy material for coupling the detector to the structure subject to vibrations. In an alternative embodiment, the thin transparent film material detector comprises a thin film dielectric material having top and bottom reflective surfaces coupled to the vibrating structure by an epoxy material. The thin film dielectric material may be a layer of magnesium fluoride sputtered onto a thin metallic sheet such as a thin aluminum sheet.

Other features and details of the method and apparatus of the present invention will be discussed hereinafter.

DESCRIPTION OF THE PREFERRED EMBODIMENT

Figure 1A:
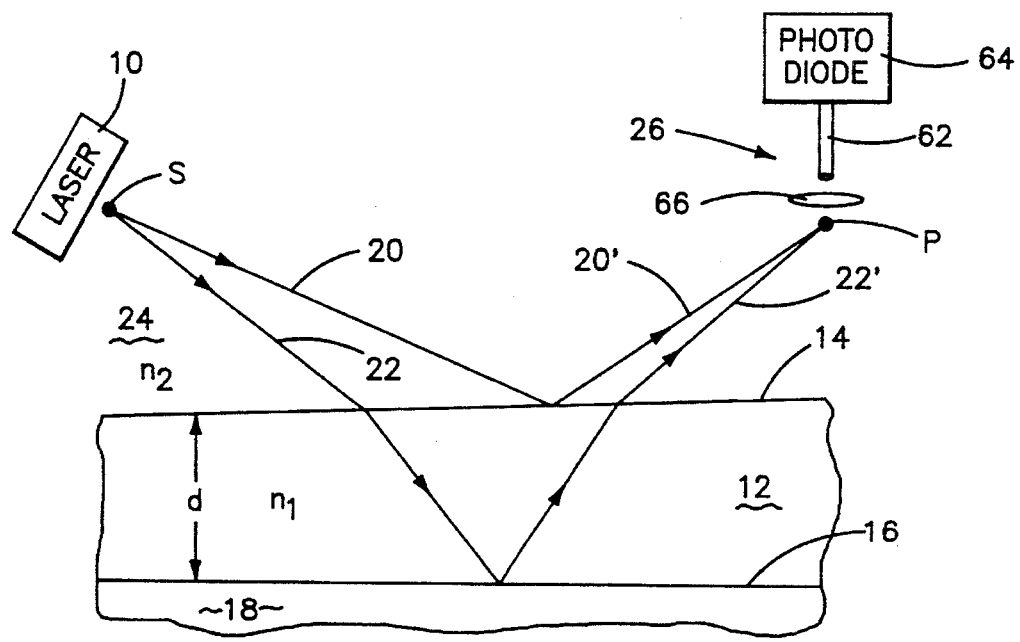
FIGS. 1a and 1b are schematic representations of the apparatus of the present invention and its method of operation.
Figure 1B:
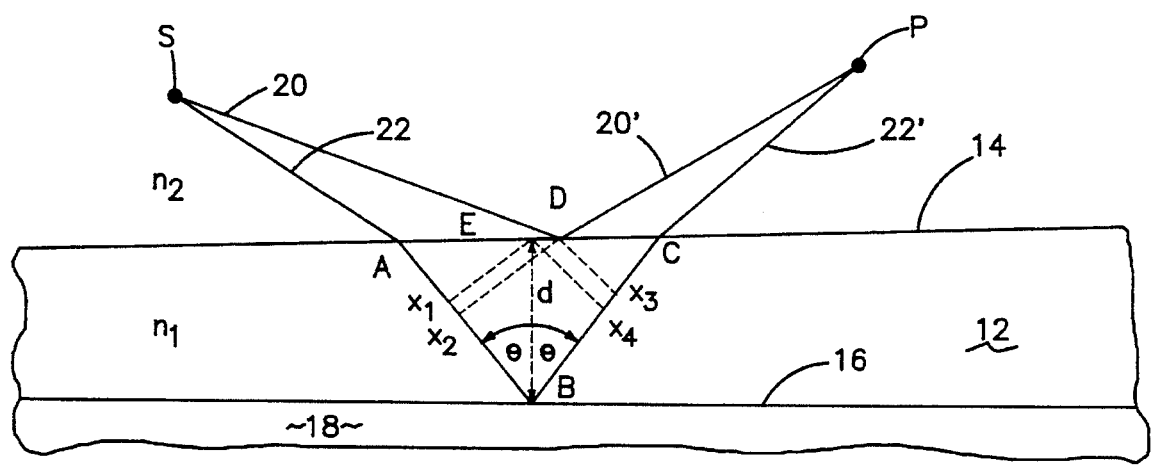

As previously mentioned, the present invention is directed to a method and apparatus which employ optical interference patterns for sensing and measuring vibrational energy in a structure subject to vibrations. FIGS. 1a and 1b and the following discussion thereof are provided so that the present invention may be readily understood.

Referring now to FIGS. 1a and 1b, a quasi-monochromatic light source 10 is used to illuminate a thin transparent film material 12 with optically reflecting surfaces 14 and 16 acting as a vibration detector. The surfaces 14 and 16 need not be parallel to perform the method of the present invention. One surface 16 however is coupled to a structure 18 subject to vibrations.

Rays of light 20 and 22 emanating from the light source 10 are reflected by the surfaces 14 and 16. The incident light rays 20' and 22' ultimately reach a point P and create an interference pattern. The interference pattern consists of zones of constructive and destructive interference produced by variations in the thickness d of the film material caused by vibrational energy being transmitted from the structure to the film material 12. Variations in the thickness d of the film material 12 result in optical path length changes in the rays 20 and 22 due to reflection at surface 14 and refraction through the film material 12, reflection at surface 16 and refraction through the film material 12 respectively.

The optical path lengths of the light rays 20 and 22 may be described as SDP and SABCP, respectively. The difference $\Delta L$ between these two optical paths may be expressed by the following equation:

$$\Delta L = n_1(AB+BC) + n_2(SA+CP-SD-DP) \tag{1}$$

where $n_1$ is the refractive index of the film material 12; and where $n_2$ is the refractive index of the surrounding medium 24.

For a very thin film material, the optical lengths may be expressed as:

$$n_2 SD \approx n_2 SA + n_1 AX_2 \tag{2}$$

and $$n_2 DP \approx n_2 CP + n_1 CX_3. \tag{3}$$

Therefore, the difference $\Delta L$ may be expressed as:

$$\Delta L \approx n_1(BX_2 + BX_3) \tag{4}$$

For very small angles between the surfaces 14 and 16, $$BX_2 + BX_3 \approx BX_1 + BX_4 \tag{5}$$

Therefore, $$BX_1 \approx BX_4 \approx d \cos\theta \tag{6}$$

By substituting, one arrives at the following equation:

$$\Delta L = 2 n_1 d \cos\theta \tag{7}$$

In general, the phase angle of light $\Phi$ is given by the equation:

$$\Phi = (2\pi/\lambda) n l \tag{8}$$

where $\lambda$ is the wavelength of the source, n is the refractive index, and l is the optical path length.

Differentiating with respect to l, $$d\Phi/dl = (2\pi/\lambda) n_1 \tag{9}$$

The discrete approximation is $$\Delta\Phi/\Delta l = (2\pi/\lambda) n_1 \tag{10}$$

By substitution, $$\Delta\Phi = (4\pi/\lambda) n_1 d \cos\theta \tag{11}$$

is the resultant optical phase change.

If the range of values of $\cos\theta$ are sufficiently small, the range of $\Delta\Phi$ as viewed at a point P will be much less than $2\pi$. As a result, fringes will be visible at the film. The requirement for small $\cos\theta$ is achieved with near normal observation at the film (i.e., angle of incidence is a small angle) and by restricting the entrance pupil at the observation point. The maxima of intensity is given by the equation $$2n_1 d \cos\pm\lambda/2 = m\lambda \text{ where } m = 0,1,2, \tag{12}$$

and the minima of intensity is given by the equation $$2n_1 d \cos\theta \pm \lambda/2 = m\lambda \text{ where } m = \frac{1}{2}, \frac{3}{2}, \frac{5}{2}, \tag{13}$$

The time rate change of the zones of intensity maxima and minima (the fringe pattern) caused by changes in the thickness d of the film material 12 is directly proportional to the frequency content of the vibrational energy. By monitoring and/or measuring these changes in the fringe pattern, it is possible to measure the vibrational energy in the structure.

In accordance with the present invention, the apparatus for measuring and sensing the vibrational energy in a structure subject to vibrations has three basic components to it. They include the quasi-monochromatic light source 10, the thin transparent film material 12 and a light detector 26 at the point P. The light source 10 may comprise any suitable means known in the art for transmitting a beam of coherent light to the thin transparent film material 12. In a preferred embodiment, the light source 10 comprises a laser. The laser may be a diode pumped solid state ring laser, a distributed feed-back laser or a helium-neon laser.

Figure 2:
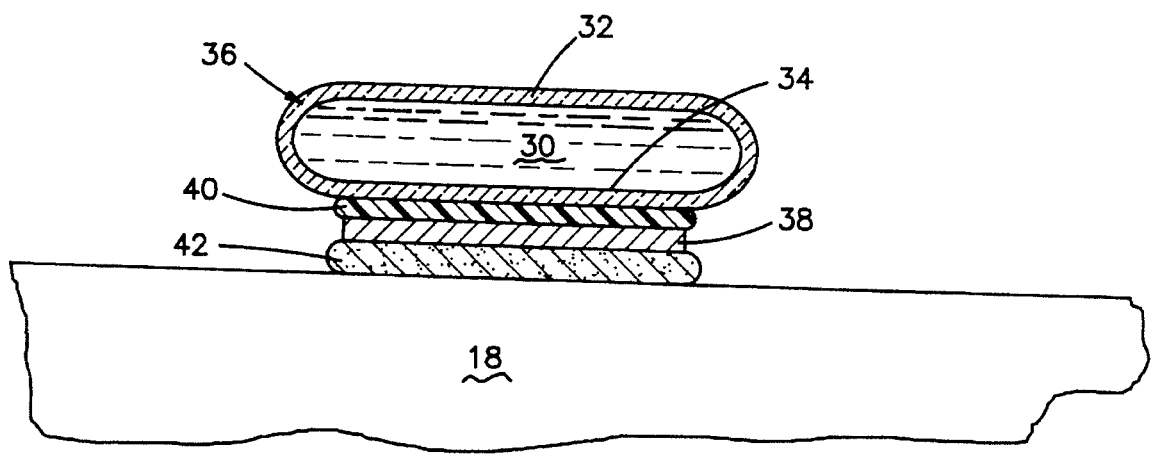
FIG. 2 is a sectional view of a first embodiment of a vibration doctor in accordance with the present invention.

FIG. 2 illustrates one embodiment of the thin transparent film material used as the vibration detector employed in the apparatus of the present invention. As shown in FIG. 2, the transparent film material comprises a thin film of oil 30 sandwiched between two layers 32 and 34 of a transparent plastic material. The plastic layers are joined together so as to form a containment pouch 36 for the oil.

The refractive indices of oil and plastic are approximately the same at 1.5. This results in a reflection of light at the top air to plastic boundary 32 of approximately 4%. The remaining light will propagate through the thin film of oil to the bottom plastic layer 34.

If desired, a metallic reflector 38 may be bonded to the bottom plastic layer 34. The metallic reflector may be formed from any suitable material known in the art such as an aluminum sheet. The use of such a metallic reflector insures that the bottom layer will be a reflecting layer. The metallic reflector 38 may be bonded or coupled to the layer 34 using any suitable means known in the art. It is preferred however to use an epoxy material 40 which has the characteristic of being optically transmissive at the optical wavelength of interest.

The thin transparent film material used as the detector of vibrational energy in the structure 18 may be coupled to the vibrating structure 18 of interest by using an epoxy material 42 which is stiff relative to the stiffness of the thin film. By using such a material, one avoids it acting as a shock absorber. It also insures that the vibrational energy is transmitted to the thin film material.

Figure 3:
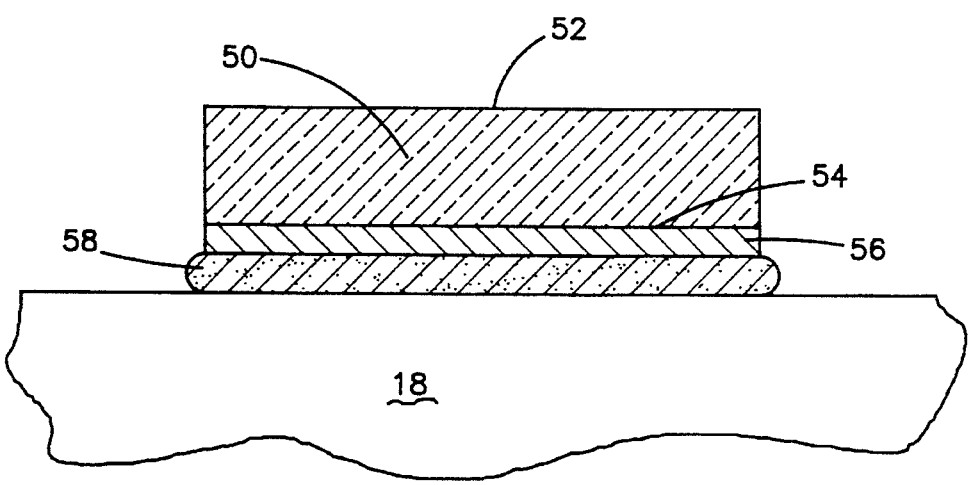
FIG. 3 is a sectional view of a second embodiment of a vibration detector in accordance with the present invention.

FIG. 3 illustrates another embodiment of the thin transparent film material of the present invention. As shown in this figure, the thin transparent film material comprises a thin film dielectric material 50 having top and bottom reflective surfaces 52 and 54. If desired, a metallic reflector 56, such as a thin sheet of aluminum material, may be bonded to the dielectric material 50 to form the bottom reflective surface. Using an aluminum material gives approximately 75% or greater reflection of the incident light in the optical wavelength range from 0.2 microns to greater than 10.0 microns.

In the embodiment shown in FIG. 3, the thin film dielectric material can be magnesium fluoride. If desired, the dielectric film material such as the magnesium fluoride may be sputtered onto the thin metallic sheet. The top reflective surface 52 can be the surface of the thin dielectric material itself. Magnesium fluoride has an optical index of refraction of approximately 1.4. Light propagating in air, incident onto the magnesium fluoride, will experience about a 4% Fresnel reflection at that boundary. The remaining light will be transmitted through the thin film material to the bottom reflective layer.

As in the previous embodiment, the thin transparent film material can be coupled to the vibrating structure of interest by using an epoxy material 58 which is stiff relative to the stiffness of the thin film.

The detection of the zones of intensity maxima and minima (fringe pattern) or the phase differences between the reflected light beam caused by changes in the thickness d of the film material resulting from vibrations transmitted thereto can be accomplished by, although not restricted to, the use of a detector 26. The detector 26 may comprise an optical fiber 62 or a bundle of fibers placed normal to the top surface 14. The fiber or bundle of fibers may be coupled to a photodiode 64 for signal detection. A lens 66 or series of lens may be used to focus the light onto the fiber or the fiber bundle 62.

Using standard mathematical techniques well known in the art, the frequency content of the vibrational energy can be determined from the detected time rate changes of the fringe patterns or changes in phase difference since they are directly proportional to each other.

In operation, a thin transparent film material such as that illustrated in either FIG. 2 or FIG. 3 is coupled to a vibrating structure of interest. A light source 10 such as a laser is used to provide a coherent light beam to illuminate the transparent film material. The light rays emanating from the light source 10 are reflected in part by the top surface of the thin transparent film material 12. The remainder of the light rays pass through the transparent film material 12 and are reflected by the bottom surface thereof. The reflected light beams reach a point P and create an interference pattern. Changes in this interference pattern, which are also time rate of position changes of a fringe pattern, are monitored by a detector 26 at the point P. The detector 26 may comprise an optical fiber or optical fiber bundle 62 arranged normal to the top surface of the thin transparent film material 12 and a photodiode 64 joined to the fiber or fiber bundle. If necessary, one or more lens 66 may be provided to focus the reflected light rays on the fiber 62 or fiber bundle.

The principal advantages of the method and apparatus of the present invention over prior methods and apparatuses are size and processing. The apparatus of the present invention can be reduced to very small dimensions, i.e. the diameter of a fiber optic cable. Complex computational devices are not required to determine frequency content of the vibrational energy. For example, to determine the frequency content, the coherent light source can be switched at required Nyquist rates to provide a direct estimate (count) of response for a selected frequency. An array of measuring devices in accordance with the present invention can be formed serially by adjusting the sampling schedule for a group of sensors. Finally, due to the small size of the devices in accordance with the present invention, large numbers of the measuring devices can be grouped to provide large array gains and mechanical baffling is possible to enhance directional response.

It is apparent that there has been provided in accordance with this invention a method and apparatus for the detection of vibrational energy via optical interference patterns which fully satisfy the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for sensing and measuring vibrational energy in a structure comprising the steps of:

applying a thin transparent film material having a thickness to a structure subject to vibrations; and measuring said vibrational energy within said structure by optically measuring changes in the thickness of said thin transparent film material resulting from vibrations within said structure transmitted to said thin transparent film material.

2. The method of claim 1 wherein said measuring step comprises:

illuminating surfaces of said thin transparent film material; and monitoring said changes in the thickness of said thin transparent film material by measuring the phase differences between a first beam reflected by a first one of said surfaces and a second beam reflected by a second one of said surfaces caused by said thickness changes.

3. The method of claim 1 wherein said applying step comprises:

providing a thin film of oil positioned between two layers of transparent plastic material; and coupling a bottom one of said layers of plastic material to said structure.

4. The method of claim 1 wherein said applying step comprises:

providing a thin film dielectric material having reflective top and bottom surfaces; and coupling said bottom surface of said thin film dielectric material to said structure.

5. A method for sensing and measuring vibrational energy in a structure comprising the steps of:

applying a thin transparent film material having a thickness to a structure subject to vibrations;

measuring said vibrational energy within said structure by measuring changes in the thickness of said thin transparent film material resulting from vibrations within said structure transmitted to said thin transparent film material;

illuminating surfaces of said thin film material with a light beam; and monitoring changes in a resulting fringe pattern in said thin film material caused by said changes in the thickness of said thin transparent film material to obtain data about said vibrational energy.

6. The method of claim 5 wherein said illuminating step comprises illuminating said surfaces with a beam of coherent light.

7. The method of claim 5 wherein said illuminating step comprises illuminating said surfaces with a laser beam.

8. A method for sensing and measuring vibrational energy in a structure comprising the steps of:

applying a thin transparent film material having a thickness to a structure subject to vibrations;

measuring said vibrational energy within said structure by measuring changes in the thickness of said thin transparent film material resulting from vibrations within said structure transmitted to said thin transparent film material;

providing at least one optical fiber for detecting said changes in thickness of said thin transparent film material, said measuring step further including illuminating surfaces of said thin film material with a light beam; and providing at least one lens to focus light reflected by said surfaces onto said at least one optical fiber.

9. The method of claim 8 further comprising:

coupling a photodiode to said at least one optical fiber to detect said changes in thickness of said thin transparent film material by measuring changes in said light reflected by said surfaces.

10. An apparatus for sensing and measuring vibrational energy in a structure which comprises:

a thin transparent film material having a thickness coupled to a structure subject to vibrations; and means for optically measuring the vibrational energy within said structure by measuring changes in the thickness of said thin transparent film material resulting from vibrations within said structure transmitted to said thin transparent film material.

11. The apparatus of claim 10 wherein said measuring means comprises:

means for illuminating surfaces of said thin transparent film material; and means for monitoring changes in the thickness of said thin transparent film material by measuring the phase differences between a first beam reflected by a first one of said surfaces and a second beam reflected by a second one of said surfaces caused by said thickness changes.

12. The apparatus of claim 10 wherein said thin transparent film material comprises a thin film of oil located within a transparent plastic material.

13. The apparatus of claim 12 further comprising:

an optically transmissive epoxy material positioned adjacent a bottom surface of said transparent plastic material;

a light reflective material positioned adjacent said epoxy material; and a stiff epoxy material positioned adjacent said light reflective material for bonding said thin transparent film material to said vibrating structure.

14. The apparatus of claim 10 wherein said thin transparent film material comprises:

a dielectric thin film material having a top reflective surface and a lower surface;

a metallic reflector adjacent said lower surface; and a layer of stiff epoxy material adjacent said metallic reflector for coupling said thin transparent film material to said vibrating structure.

15. An apparatus for sensing and measuring vibrational energy in a structure which comprises:

a thin transparent film material having a thickness coupled to a structure subject to vibrations;

means for measuring the vibrational energy within said structure by measuring changes in the thickness of said thin transparent film material resulting from vibrations within said structure transmitted to said thin transparent film material;

means for illuminating surfaces of said thin transparent film material; and means for monitoring changes in a resulting fringe pattern in said thin film material caused by said changes in the thickness of said thin transparent film material to obtain data about said vibrational energy;

means for monitoring changes in the thickness of said thin transparent film material by measuring the phase differences between a first beam reflected by a first one of said surfaces and a second beam reflected by a second one of said surfaces caused by said thickness changes.

16. The apparatus of claim 15 wherein said illuminating means comprises means for generating a coherent beam of light.

17. The apparatus of claim 15 wherein said illuminating means comprises means for generating a laser beam.

18. An apparatus for sensing and measuring vibrational energy in a structure which comprises:

a thin transparent film material having a thickness coupled to a structure subject to vibrations;

means for measuring the vibrational energy within said structure by measuring changes in the thickness of said thin transparent film material resulting from vibrations within said structure transmitted to said thin transparent film material;

said means for measuring vibrational including at least one optical fiber for detecting said changes in said thickness of said transparent film material; and said means for measuring vibrational energy further comprising means for illuminating surfaces of said thin film material with a light beam and at least one lens for focussing light reflected by said surfaces onto said at least one optical fiber;

a layer of stiff epoxy material adjacent said metallic reflector for coupling said thin transparent film material to said vibrating structure.

19. The apparatus of claim 18 further comprising:

a photodiode coupled to said at least one optical fiber to detect said changes in said thickness of said thin transparent film material by measuring changes in the light reflected by said surfaces.

20. A detector for use in an apparatus optically measuring vibrational energy in a structure subject to vibrations, said detector comprising:

a thin film of oil contained within a transparent plastic containment pouch, said pouch having top and bottom surfaces.

21. The detector of claim 20 further comprising:

a metallic reflector bonded to said bottom surface.

22. The detector of claim 20 further comprising:

means for coupling said containment pouch to said structure subject to vibrations.

23. A detector for use in an apparatus optically measuring vibrational energy in a structure subject to vibrations, said detector comprising a thin film dielectric material having top and bottom surfaces which are reflective, said dielectric material being transparent so as to allow light to pass through said dielectric material and reflect off said bottom surface, and said dielectric material having at least one of said surfaces in contact with said structure so that vibrations in said structure are transmitted to said dielectric material.

24. The detector of claim 23 wherein said thin film material comprises a magnesium fluoride sputtered onto a thin metallic sheet.

25. The detector of claim 23 wherein the bottom reflective surface of said thin film material is formed by a layer of aluminum material.

26. The detector of claim 23 wherein said thin film dielectric material comprises magnesium fluoride.

27. The detector of claim 23 further comprising:

means for coupling said thin film dielectric material to said structure.

28. The detector of claim 27 wherein said coupling means comprises an epoxy material which is stiff relative to the stiffness of said thin film dielectric material.

* * * * *